(12) United States Patent
Uschold et al.

(10) Patent No.: US 7,842,765 B2
(45) Date of Patent: *Nov. 30, 2010

(54) CROSSLINKABLE VINYL FLUORIDE COPOLYMERS

(75) Inventors: Ronald Earl Uschold, West Chester, PA (US); Jian Wang, Shizuoka (JP); Masahiro Yamamoto, Shizuoka (JP)

(73) Assignees: E. I. du Pont de Nemours and Company, Wilmington, DE (US); Dupont-Mitsui Fluorochemicals Co Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/962,134

(22) Filed: Dec. 21, 2007

(65) Prior Publication Data

US 2008/0154004 A1    Jun. 26, 2008

Related U.S. Application Data

(62) Division of application No. 60/876,442, filed on Dec. 21, 2006.

(60) Provisional application No. 60/964,085, filed on Aug. 9, 2007.

(51) Int. Cl.
*C08F 14/20* (2006.01)

(52) U.S. Cl. .................. 526/250; 524/544; 524/545; 525/199; 525/200; 525/326.3; 526/255

(58) Field of Classification Search .................. 524/544, 524/545; 526/250, 255; 525/199, 200, 326.3
See application file for complete search history.

(56) References Cited

U.S. PATENT DOCUMENTS

| | | | |
|---|---|---|---|
| 2,409,948 A | 10/1946 | Martin | |
| 2,419,008 A | 4/1947 | Coffman et al. | |
| 2,419,009 A | 4/1947 | Coffman et al. | |
| 2,468,664 A | 4/1949 | Hanford et al. | |
| 2,510,783 A | 6/1950 | Johnston et al. | |
| 2,559,752 A | 7/1951 | Berry | |
| 2,599,300 A | 6/1952 | Upson | |
| 3,087,827 A | 4/1963 | Klenke et al. | |
| 3,087,828 A | 4/1963 | Linton | |
| 3,087,829 A | 4/1963 | Linton | |
| 3,133,854 A | 5/1964 | Simms | |
| 3,318,850 A | 5/1967 | Stilmar | |
| 3,360,396 A | 12/1967 | Kennedy et al. | |
| 3,513,116 A | 5/1970 | Sianesi et al. | |
| 3,524,906 A | 8/1970 | Schmitt et al. | |
| 3,531,441 A | 9/1970 | Stilmar | |
| 3,581,779 A | 6/1971 | Sylvia, Jr. | |
| 3,895,029 A | 7/1975 | Ward | |
| 4,183,837 A | 1/1980 | Tamura et al. | |
| 4,273,829 A | 6/1981 | Perreault | |
| 4,341,685 A | 7/1982 | Miyake et al. | |
| 4,385,150 A | 5/1983 | Miyake et al. | |
| 4,557,977 A | 12/1985 | Memmer et al. | |
| 4,581,412 A | 4/1986 | Ohmori et al. | |
| 4,634,754 A | 1/1987 | Ohmori et al. | |
| 4,659,768 A | 4/1987 | Tortorello et al. | |
| 4,745,165 A | 5/1988 | Arcella et al. | |
| 4,786,546 A | 11/1988 | Vassiliou | |
| 4,877,683 A | 10/1989 | Bragaw et al. | |
| 4,931,324 A | 6/1990 | Ellison et al. | |
| 4,959,189 A | 9/1990 | Rohrbacher et al. | |
| 5,053,469 A | 10/1991 | Tatemoto et al. | |
| 5,059,720 A | 10/1991 | Hung | |
| 5,085,939 A | 2/1992 | Wenz et al. | |
| 5,139,878 A | 8/1992 | Kim et al. | |
| 5,169,915 A | 12/1992 | Mohri et al. | |
| 5,225,260 A | 7/1993 | McNaul et al. | |
| 5,250,597 A | 10/1993 | Uschold | |
| 5,688,884 A | 11/1997 | Baker et al. | |
| 5,707,697 A | 1/1998 | Spain et al. | |
| 5,804,650 A | 9/1998 | Tsuda et al. | |
| 5,846,650 A | 12/1998 | Ko et al. | |
| 5,969,067 A | 10/1999 | Brothers et al. | |
| 6,060,158 A | 5/2000 | Ono et al. | |

(Continued)

FOREIGN PATENT DOCUMENTS

EP    0 199 138 B1    10/1986

(Continued)

OTHER PUBLICATIONS

Sianesi et al., "Polymerization and Copolymerization Studies on Vinyl Fluoride", Journal of Polymer Science: Part A-1, vol. 6, (1968), pp. 335-352.

*Primary Examiner*—Mark Eashoo
*Assistant Examiner*—Nicole M Buie-Hatcher

(57) ABSTRACT

The present invention provides a vinyl fluoride copolymer comprising:
  about 40 to about 90 mole % of repeat units derived from vinyl fluoride; and
  about 10 to about 60 mole % of repeat units derived from monomer selected from the group consisting of (a) and (b) below and mixtures thereof, with the proviso that about 0.1 mole % to 50 mole % of repeat units in the copolymer are derived from monomer selected from (b):
  (a) monomer selected from the group consisting of, tetrafluoroethylene, trifluoroethylene, chlorotrifluoroethylene and mixtures thereof; and
  (b) vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide.

19 Claims, No Drawings

U.S. PATENT DOCUMENTS

| | | | |
|---|---|---|---|
| 6,080,487 | A | 6/2000 | Coggio et al. |
| 6,107,423 | A | 8/2000 | Wheland et al. |
| 6,177,196 | B1 | 1/2001 | Brothers et al. |
| 6,242,547 | B1 * | 6/2001 | Uschold .................... 526/242 |
| 6,271,303 | B1 | 8/2001 | Uschold |
| 6,383,620 | B1 | 5/2002 | Aoyama et al. |
| 6,387,570 | B1 | 5/2002 | Nakamura et al. |
| 6,403,740 | B1 | 6/2002 | Uschold |
| 6,479,578 | B2 * | 11/2002 | Araki et al. ................ 524/517 |
| 6,632,518 | B1 | 10/2003 | Schmidt et al. |
| 6,710,123 | B1 | 3/2004 | Amin-Sanayei et al. |
| 6,794,027 | B1 | 9/2004 | Araki et al. |
| 6,833,414 | B2 | 12/2004 | Granel et al. |
| 7,112,363 | B2 | 9/2006 | Moya |
| 7,270,870 | B2 | 9/2007 | Hetzler et al. |
| 7,288,600 | B2 | 10/2007 | Moya |
| 7,553,540 | B2 | 6/2009 | Debergalis et al. |
| 2002/0012801 | A1 | 1/2002 | Oreins et al. |
| 2002/0151665 | A1 * | 10/2002 | Uschold .................... 526/255 |
| 2003/0087103 | A1 | 5/2003 | Belmares et al. |
| 2004/0059033 | A1 | 3/2004 | Toriumi |
| 2004/0192828 | A1 * | 9/2004 | Mitsuhata et al. .......... 524/544 |
| 2005/0158558 | A1 | 7/2005 | Hayashida et al. |
| 2006/0148350 | A1 | 7/2006 | Chang et al. |
| 2006/0148971 | A1 | 7/2006 | Jing et al. |
| 2006/0199029 | A1 | 9/2006 | Liu et al. |
| 2006/0234038 | A1 | 10/2006 | Kernander et al. |
| 2006/0280922 | A1 | 12/2006 | Hull et al. |
| 2007/0060708 | A1 | 3/2007 | Wang et al. |
| 2008/0149887 | A1 | 6/2008 | Wang et al. |
| 2008/0154004 | A1 | 6/2008 | Uschold et al. |

FOREIGN PATENT DOCUMENTS

| | | |
|---|---|---|
| GB | 1 395 432 | 5/1975 |
| JP | 61-107009 | 5/1986 |
| JP | 07-070508 | 3/1995 |
| JP | 7-118348 | 5/1995 |
| JP | 1995118348 A | 5/1995 |
| JP | 3467499 B2 | 1/1997 |
| JP | 3440963 B2 | 2/1997 |
| JP | 2001-315274 | 11/2001 |
| JP | 3501113 B2 | 4/2002 |
| JP | 2004-079327 A | 3/2004 |
| JP | 2006-031951 A | 2/2006 |
| JP | 2006-169328 | 6/2006 |
| WO | WO 97/49777 | 12/1997 |
| WO | WO 98/46657 | 10/1998 |
| WO | WO 98/46658 | 10/1998 |
| WO | 2006/086081 A1 | 8/2006 |
| WO | WO 2007/009140 A1 | 1/2007 |

* cited by examiner

CROSSLINKABLE VINYL FLUORIDE COPOLYMERS

FIELD OF INVENTION

The invention is in the field of vinyl fluoride copolymers containing functional groups and their preparation and use in making protective coatings and shaped articles including films.

BACKGROUND OF THE INVENTION

Polyvinyl fluoride (PVF) has been manufactured for many years and has found many uses as a protective film or coating over a variety of substrates providing durable and cleanable surfaces. However, polymers with a large amount of vinyl fluoride content cannot be processed from the melt (e.g., molded) because the thermal decomposition of PVF occurs at its melting point of about 200° C. Further, since PVF does not dissolve in most solvents at ordinary temperature due to its high crystallinity and to large amounts of intermolecular hydrogen bonding, casting a film from a solution is also difficult. Consequently, PVF is usually dispersed in a polar solvent having a high boiling point to coalesce and form a film at elevated temperature. This method requires complicated technology and equipment, and does not provide for easy on-site application in the form of paint or coating.

The fluorine atoms in PVF are largely responsible for its properties of excellent weatherability, chemical resistance and mechanical properties. Enhancement of these properties may be achieved with polymers of higher fluorine content. One way to increase polymer fluorine content is to prepare copolymers in which tetrafluoroethylene (TFE) replaces some of the vinyl fluoride (VF). Such dipolymers have been described by Coffman and Ford, U.S. Pat. No. 2,419,009 (1947); Sianesi and Caporiccio, J. Polymer Sci., Part A-1, 6, (1968) 335, and U.S. Pat. No. 3,513,116 (1970). Another way is reported in Stilmar, U.S. Pat. No. 3,531,441 (1970) which describes the preparation of tri- and tetra-polymers comprised of VF, TFE and a vinylidene monomer having neither an aromatic group nor a halogen group attached to the vinylidene group in non-aqueous media. More recently, vinyl fluoride copolymers and vinyl fluoride interpolymers with low crystallinity have been described by Uschold in U.S. Pat. No. 6,242,547 (2001), U.S. Pat. No. 6,271,303 (2001), U.S. Pat. No. 6,403,740 (2002) and JP-C-2001-524146 (2001), Uschold in U.S. Pat. No. 6,242,547 proposes an interpolymer comprised of VF and at least two highly fluorinated monomers wherein at least one of the highly fluorinated monomers introduces a side chain having at least one carbon atom into the polymer. Such an interpolymer dissolves easily in some organic solvents because of decreased crystallinity, and also a film obtained from the interpolymer has low surface tension.

However, in the VF copolymers previously prepared, as fluorine content in the VF copolymer increases, the resulting resin tends to have lower intermolecular forces (intermolecular cohesive energy) and lower critical surface tension resulting in reduced adhesiveness to substrates, especially to metals and glass.

In addition, in order to improve processability, in particular, solubility of the polymer in an organic solvent, it is necessary to reduce the crystallinity or molecular weight of the VF copolymer. However, this results in reduced mechanical performance, thermal resistance and adhesiveness to substrates.

BRIEF SUMMARY OF THE INVENTION

The present invention provides a vinyl fluoride copolymer comprising:
about 40 to about 90 mole % of repeat units derived from vinyl fluoride; and
about 10 to about 60 mole % of repeat units derived from monomer selected from the group consisting of (a) and (b) below and mixtures thereof, with the proviso that about 0.1 mole % to 50 mole % of repeat units in the copolymer are derived from monomer selected from (b):
(a) monomer selected from the group consisting of, tetrafluoroethylene, trifluoroethylene, chlorotrifluoroethylene and mixtures thereof; and
(b) vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide.

Preferred vinyl fluoride copolymers further comprise about 0.1 to about 10 mole % of repeat units derived from monomer (c) selected from the group consisting of fluorinated vinyl ethers, fluorinated alkyl (meth)acrylates, perfluoroolefins having 3-10 carbon atoms, perfluoro C1-C8 alkyl ethylenes, fluorinated dioxoles and mixtures thereof.

In a preferred form of vinyl fluoride copolymer, monomer (b) is fluorinated vinyl monomer containing the at least one functional group, and more preferably, (b) is fluorinated vinyl ether monomer containing the at least one functional group.

In another preferred form of the vinyl fluoride copolymer, monomer (a) comprises tetrafluoroethylene.

The invention also provides a crosslinkable polymeric composition comprising the vinyl fluoride copolymer and at least one crosslinking agent selected from the group consisting of alcohols, phenols, thiols, peroxides, amines, azo compounds, carboxylic acids, carboxylic esters, acid anhydrides, sulfonic acids, sulfonic esters, phosphoric acids, phosphoric esters, boric acids, boric esters, epoxies, isocyanates, thiocyanates, nitriles, melamines, aldehydes, sulfide compounds, silane compounds, metal oxides, halogen compounds and organic metal compounds.

The invention also provides a crosslinkable polymeric composition comprising the vinyl fluoride copolymer having units derived from at least two monomers selected from (b) which provide functional groups which are capable of crosslinking with each other.

The invention can be embodied as fluoropolymer blend comprising the vinyl fluoride copolymer and at least one fluoropolymer different from the vinyl fluoride copolymer.

An aqueous liquid dispersion or an organic liquid dispersion or solution of the vinyl fluoride copolymer, as well a coating composition, are also provided by the invention.

The invention further provides a shaped article made from dispersions or solutions of the vinyl fluoride copolymer, preferably in the form of films. A shaped article can also be made by molding the vinyl fluoride copolymer.

The vinyl fluoride copolymer in accordance with the invention is readily used to make protective coatings and processed into articles such as films from dispersion or solution form.

Desirable mechanical properties and/or adhesiveness to substrates can be obtained by crosslinking.

DETAILED DESCRIPTION OF THE INVENTION

The vinyl fluoride copolymer of the invention comprises:
about 40 to about 90 mole % of repeat units derived from vinyl fluoride; and
about 10 to about 60 mole % of repeat units derived from monomer selected from the group consisting of (a) and (b) below and mixtures thereof, with the proviso that about 0.1 mole % to 50 mole % of repeat units in the copolymer are derived from monomer selected from (b):
 (a) monomer selected from the group consisting of, tetrafluoroethylene, trifluoroethylene, chlorotrifluoroethylene and mixtures thereof; and
 (b) vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide.

Preferred vinyl fluoride copolymers further comprise about 0.1 to about 10 mole % of repeat units derived from monomer (c) selected from the group consisting of fluorinated vinyl ethers, fluorinated alkyl (meth)acrylates, perfluoroolefins having 3-10 carbon atoms, perfluoro C1-C8 alkyl ethylenes, fluorinated dioxoles and mixtures thereof.

The amounts of monomer units within the stated ranges can be varied to adjust the properties of the polymer as desired. Vinyl fluoride (VF) can be varied within the range of about 40 to about 90 mole %, to adjust the properties of the polymer. For example, VF generally provides copolymers with lower solubility in organic solvents than a polymer which is otherwise the same but containing VdF. When it is desired to improve weatherability, chemical resistance, and thermal stability, it is generally desirable to decrease VF content and increase the quantity of monomers which have higher fluorine content than VF. Preferably, the vinyl fluoride-based copolymer of the present invention comprises 50 to 80% by mole of a structural units derived from vinyl fluoride (VF).

A copolymer in accordance with the invention comprises about 10 to about 60 mole % of repeat units derived from monomer selected from the group consisting of (a) and (b) and mixtures thereof, preferably, about 20 to about 50 mole %. Preferably, monomer (b) and/or monomer (c), if used, introduce into the polymer a side chain of at least one carbon atom. Monomers which provide the side chain of at least one carbon atom can improve solubility of the copolymer in organic solvents.

Monomer (a) is selected from the group consisting of, tetrafluoroethylene, trifluoroethylene, chlorotrifluoroethylene, and mixtures thereof. The monomer chosen and the amount employed can increase the fluorine content of the polymer and can also influence the solubility of the polymer in organic solvent. For example, a preferred monomer (a) is tetrafluoroethylene (TFE) and preferred vinyl fluoride copolymers of the invention preferably comprise at least about 30 mol % units derived from tetrafluoroethylene. Tetrafluoroethylene is a preferred monomer because of low cost and high fluorine content. A high content of —$CF_2CF_2$— segments in the copolymer provides improved weatherability, chemical resistance and thermal stability but may decrease solubility in organic solvents.

Preferred vinyl fluoride copolymers further comprise about 0.1 to about 10 mole % of repeat units derived from monomer (c) selected from the groups consisting of fluorinated vinyl ethers, fluorinated alkyl (meth)acrylates, perfluoroolefins having 3-10 carbon atoms, perfluoro C1-C8 alkyl ethylenes, fluorinated dioxoles and mixtures thereof. Monomers of this type which introduce into the copolymer a side chain of at least one carbon atom generally will improve solubility of the copolymer in organic solvents. Especially preferred for monomer (c) are perfluoroolefins having 3-10 carbon atoms, perfluoro C1-C8 alkyl ethylenes, and fluorinated vinyl ethers. Most preferably, highly fluorinated vinyl ethers and perfluoro C1-C8 alkyl ethylenes are used.

The monomer (b) is a vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide. Preferably, monomer (b) also introduces a side chain into the copolymer of at least one carbon atom. The functional groups of monomer (b) provide a cross-linkable reaction site and the introduced functional group (and side chain if present) may also improve the solubility of the copolymer in organic solvents to improve processability of the vinyl fluoride copolymer of the invention. In the copolymer in accordance with the invention, units derived from monomer (b) are present in an amount of about 0.1 mole % to 50 mole %, preferably about 0.1 mole % to about 40 mole %, and more preferably, about 0.2 mole % to 30 mole %, and most preferably, about 0.2 mole % to about 20 mole %. The ability of the various vinyl monomers with functional groups to form cross-links and adjust solubility characteristics will vary with the particular monomer(s) employed so sufficient quantity of such monomers should be employed to provide the desired effect.

Preferably, to increase fluorine content of the copolymer, monomer (b) comprises fluorinated vinyl monomer containing at least one functional group. More preferably, monomer (b) is a fluorinated vinyl ether monomer containing at least one functional group. Fluorinated vinyl ether monomers of this type are disclosed in Hung, U.S. Pat. No. 5,059,720, Brothers et al., U.S. Pat. No. 5,969,067 and Brothers et al., U.S. Pat. No. 6,177,196. One particular useful monomer disclosed in Hung, U.S. Pat. No. 5,059,720, is 9,9-dihydro-9-hydroxy-perfluoro(3,6-dioxa-5-methyl-1-nonene), referred to hereinafter as (EVE-OH).

In one preferred embodiment of this invention, the copolymer comprises units derived from about 40 to about 70 mole % VF, about 15 to about 29.9 mole % of monomers selected from (a), about 0.1 to about 15 mole % of at least one (b) vinyl monomer containing at least one functional group, and about 0.1 to about 10 mole % of at least one monomer (c). For example, a preferred vinyl fluoride copolymer having hydroxy functional groups is obtained by copolymerizing VF, monomer (a) being TFE, monomer (b) being EVE-OH, and monomer (c) being fluorinated vinyl ether and/or perfluorobutylethylene (PFBE) within the ranges stated above.

The vinyl fluoride copolymer may be produced by any of a variety of suitable polymerization methods such as such as emulsion polymerization, suspension polymerization, solution polymerization and bulk polymerization. Emulsion polymerization is desirable because of high degree of polymerization, low cost, and because polymer in dispersion is produced which is advantageous for many end uses. Emulsion polymerization can be carried out in water using a water-soluble free-radical polymerization initiator in the presence of a suitable surfactant, typically a fluorosurfactant such as ammonium perfluorooctanoate as described in Berry, U.S. Pat. No. 2,559,752 or 6, 2 TBS as described in Baker et al., U.S. Pat. No. 5,688,884, or other suitable surfactant. Polymerization temperatures of about 40° C. to 150° C. are suitable, preferably 60° C. to 100° C. and pressures of about 1 MPa to 12 MPa (145 psi to 1,760 psi) may be used. If desired, a buffering agent such as phosphate, carbonate and acetate can be used for controlling pH of the latex.

A wide variety of polymerization initiators may be used for producing the vinyl fluoride copolymer of the present invention. Preferred initiators include organic azo-type initiators such as 2,2'-azobis(2-amidinopropane)dihydrochloride and 2,2'-azobis(N,N-dimethyleneisobutyroamidine)dihydrochloride, and water-soluble salts of inorganic peracids such as alkali metal or ammonium salts of persulfuric acid. Further, a chain transfer agent is optionally used if necessary in the polymerization reaction to adjust molecular weight of the vinyl fluoride-based copolymer. Preferred chain transfer agents include ethane, cyclohexane, methanol, isopropanol, ethyl malonate and acetone and the like.

When emulsion aqueous emulsion polymerization is used to make the copolymer in accordance the invention, an aqueous dispersion of the copolymer is produced. Thus, the present invention also provides aqueous dispersions comprising the vinyl fluoride copolymer and an aqueous medium. If desired, the aqueous dispersions produced by emulsion polymerization, can be subsequently stabilized by addition of surfactant, typically nonionic surfactant, and optionally concentrated to increase solids content. If desired, the copolymer can be isolated from the dispersion to produce copolymer resin by any of a variety of known techniques such as strong agitation, increasing the ionic strength, freezing and thawing, and combinations thereof.

The invention also provides organic liquid dispersions or solutions of the vinyl fluoride copolymer of the invention in suitable organic liquid media. Organic liquids which are useful for making organic liquid dispersions and solutions of the copolymer are, for example, polar organic solvents such as N-methyl-2-pyrrolidone (NMP) and propylene carbonate, γ-butyrolactone, dimethylacetamide, dimethylsulfoxide, methylethyl ketone (MEK) and tetrahydrofuran (THF). Such dispersions or solutions are typically formed by dispersing or dissolving the copolymer in resin form in the suitable organic liquid. For the production of dispersions, grinding or milling of the dispersion may be necessary for the production of dispersion suitable for the intended purpose.

The invention also provides a crosslinkable polymeric composition comprising the vinyl fluoride copolymer and at least one crosslinking agent selected from the group consisting of alcohols, phenols, thiols, peroxides, amines, azo compounds, carboxylic acids, carboxylic esters, acid anhydrides, sulfonic acids, sulfonic esters, phosphoric acids, phosphoric esters, boric acids, boric esters, epoxies, isocyanates, thiocyanates, nitrites, melamines, aldehydes, sulfide compounds, silane compounds, metal oxides, halogen compounds and organic metal compounds.

Generally, the crosslinkable compositions in accordance with the invention are employed similarly to other crosslinkable compositions as are known in the art and are especially useful as coatings and in the production of films. In another embodiment of the invention, a coating composition is provided which comprises the cross-linkable polymeric composition and a liquid medium with the copolymer being dispersed or dissolved in the medium. The crosslinking agent employed in the composition is preferably soluble in the coating composition medium and is reactive with the types of functional groups provided in the copolymer my monomer (b). Typically, the composition will be applied to a substrate and heated to remove the liquid medium. If the copolymer is in dispersion form, heating may also be needed to coalesce the copolymer. Heating can be continued to promote reaction between the crosslinking agent and the copolymer in accordance with the invention to produce a crosslinked polymer. With some crosslinking agents, visible or UV light may be used to promote reaction between the cross-linking agent and the copolymer.

The crosslinked vinyl fluoride copolymer provided by the present invention typically has a three-dimensional network structure formed by the crosslinking agent reacting with functional groups on different polymer chains and with other function groups on the same polymer chain.

The invention also provide crosslinkable polymeric composition containing the copolymer of the invention having units derived from at least two monomers selected from (b) which provide functional groups which are capable of crosslinking with each other, i.e., a self-crosslinking copolymer. For example, a copolymer in accordance with the invention having both hydroxy groups and carboxylic acid group may be self-crosslinked by heat treatment to form ester groups in a condensation reaction. Similarly, copolymer in accordance with the invention having both hydroxy groups and a blocked isocyanate group may be self-crosslinked by heat treatment.

The present invention also provides a fluoropolymer blend comprising the copolymer of the present invention blended with at least one fluoropolymer different from the copolymer of the invention. Any of a variety of different fluoropolymers can be used including, for example, homopolymers and copolymers polymerized from vinyl fluoride (VF), vinylidene fluoride (VdF), tetrafluoroethylene (TFE), trifluoroethylene (TrFE), chlorotrifluoroethylene (CTFE), fluorinated vinyl ethers, fluoroalkyl(meth)acrylates, perfluoro($C_3$-$C_{10}$)alkenes, perfluoro($C_1$-$C_8$)alkylethylenes, fluorinated dioxoles, and the like. Preferred fluoropolymers includes polyvinyl fluoride (PVF), polyvinylidene fluoride (PVdF), VF-TFE copolymer, VF-TFE-perfluoroalkyl vinyl ether (PAVE) copolymer, VdF-hexafluoropropene (HFP) copolymer, VdF-TFE-HFP copolymer and VdF-TFE-PAVE copolymer and the like.

Fluoropolymer blends in accordance with the invention are made by any suitable methods which provide a blend of polymers useful for the anticipated purpose. Manufacturing methods include melt blending or mixing of dispersions or solutions followed by removal of the dispersion or solution medium.

Aqueous dispersions or organic liquid dispersions or solutions in accordance with the invention are preferably employed to make shaped articles, preferably films. In addition, coatings are advantageously applied to a wide range of substrates such as metal, plastic, ceramics, glass, concrete, fabric and wood. Films and coatings can be produced by conventional methods such as solvent aided extrusion, casting, dipping, spraying, and painting. Coating compositions may include any of a variety of additives as may be desired for the film or coating to be produced such as pigments, fillers, barrier particles, light stabilizers, thermal stabilizers, etc.

The copolymer in accordance with the present invention in resin form can be suitably formed into a shaped article by molding. Molding can be carried out using techniques known in the art which have been adapted for the characteristics of the copolymer being processed.

TEST METHODS

The following tests are used to determine properties of the samples in the present invention.

Melting Points

Melting points of the vinyl fluoride copolymers are measured using a differential scanning calorimeter (Pyris1, made by Perkin Elmer Inc.).

Solubility

The copolymers are dissolved in N-methyl-2-pyrrolidone (NMP) at 50° C. to 70° C. using a water-bath incubator (Model BT-31, made by Yamato Scientific Co. Ltd.)

Tensile Properties

A film is prepared using a 10% solution of the vinyl fluoride copolymers in NMP, and tensile properties are measured using TENSILON (UTM-1T, made by TOYO BALDWIN Co. Ltd.)

Adhesion Test

A vinyl fluoride copolymer solution of the present invention is mixed and put in an aluminum cup (No. 107, made by AS ONE Corp.), and then subjected to drying and cross-linking using a vacuum dryer. Adhesiveness of the resulting resin film to the aluminum substrate is evaluated by visual observation.

EXAMPLES

Examples 1-7

Comparative Example 1

Synthesis of Vinyl Fluoride-Based Copolymers

A horizontal stainless steel autoclave of 7.6 L (2 US gallons) capacity equipped with a stirrer and a jacket is used as a polymerization reactor. Instruments for measuring temperature and pressure and a compressor for supplying the monomer mixtures to the autoclave at a desired pressure are attached to the autoclave.

The autoclave is filled with deionized water containing 15 g of 6,2-TBS (prepared as described in Baker et al., U.S. Pat. No. 5,688,884) to 70 to 80% of its capacity, and is followed by increasing the internal temperature to 90° C. Then, the autoclave is purged of air by pressurizing three times to 3.1 Mpa (450 psig) using nitrogen. After purging, the autoclave is charged with the monomer mixtures having the composition shown in the following Table 1 until the internal pressure reaches 3.1 MPa (450 psig).

TABLE 1

| | Composition of Pre-charged Monomer (wt %) | | | | | |
|---|---|---|---|---|---|---|
| | TFE | VF | PPVE | PEVE | PFBE | EVE-OH |
| Example 1 | 52.7 | 27.7 | 14.8 | / | | 4.8 |
| Example 2 | 54.1 | 28.4 | / | 12.6 | | 4.9 |
| Example 3 | 51.1 | 26.8 | / | 18.1 | | 3.9 |
| Example 4 | 52.9 | 27.8 | / | 15.0 | | 4.3 |
| Example 5 | 49.7 | 26.2 | / | 19.6 | | 4.5 |
| Example 6 | 62.9 | 35.0 | / | / | 1.6 | 0.5 |
| Example 7 | 57.1 | 30.0 | / | / | 7.8 | 5.1 |
| Comp. Ex. 1 | 60.5 | 33.0 | / | / | 2.1 | / |

An initiator solution is prepared by dissolving 20 g of ammonium persulfate in 1 L of deionized water. This initiator solution is supplied into the reactor at a rate of 25 ml/minute for 5 minutes, and then the rate is lowered and maintained at 1 ml/minute during the reaction. When the internal pressure drops to 3.0 MPa, the makeup monomer mixtures shown in Table 2 are supplied to keep the pressure constant.

TABLE 2

| | Composition of Makeup Monomer (wt %) | | | | | |
|---|---|---|---|---|---|---|
| | TFE | VF | PPVE | PEVE | PFBE | EVE-OH |
| Example 1 | 54.6 | 34.0 | 7.4 | / | | 4.0 |
| Example 2 | 55.3 | 34.7 | / | 6.0 | | 4.0 |
| Example 3 | 54.8 | 34.2 | / | 8.0 | | 3.0 |
| Example 4 | 54.6 | 34.0 | / | 7.4 | | 4.0 |
| Example 5 | 53.8 | 33.8 | / | 8.9 | | 3.5 |
| Example 6 | 54.0 | 34.0 | / | / | 7.4 | 4.0 |
| Example 7 | 54.8 | 34.4 | / | / | 7.4 | 3.4 |
| Comp. Ex. 1 | 57.4 | 35.2 | / | / | 7.4 | / |

Composition of this makeup supply is different from that of the pre-charged mixture because of different reactivity of each monomer. Since the composition thereof is selected so that the monomer composition in the reactor is kept constant, a product having a uniform composition is obtained.

Monomers are supplied to the autoclave until a solid content in the produced latex reaches about 20%. When the solid content reaches a predetermined value, supply of the monomers is immediately stopped, then the content of the autoclave is cooled and unreacted gases in the autoclave are purged off.

To the resulting latex, 15 g of ammonium carbonate dissolved in water per 1 L of latex and then 70 mL of HFC-4310 (1,1,1,2,3,4,4,5,5,5-decafluoropentane) per 1 L of latex are added while stirring at high speed, followed by isolation of the polymer by filtration. The polymer is washed with water and dried at 90 to 100° C. in a hot-air dryer. Compositions and melting points of the produced polymers are shown in Table 3.

The resulting VF copolymer is dissolved in NMP at 55 to 60° C. using a water-bath incubator and then cooled to room temperature (25° C.), and solubility of the resin, at which a stable clear solution is obtained, is measured. The results are shown in Table 3.

TABLE 3

| | Composition of Polymer (mole %) | | | | | | Melting Point (° C.) | Solubility (in NMP) 25° C. |
|---|---|---|---|---|---|---|---|---|
| | TFE | VF | PPVE | PEVE | PFBE | EVE-OH | | |
| Example 1 | 39.9 | 57.1 | 2.2 | / | | 0.75 | 174 | 8-10% |
| Example 2 | 42.3 | 55.2 | / | 1.7 | | 0.78 | 178 | 8-10% |

TABLE 3-continued

|  | Composition of Polymer (mole %) | | | | | Melting Point (° C.) | Solubility (in NMP) 25° C. |
|---|---|---|---|---|---|---|---|
|  | TFE | VF | PPVE | PEVE | PFBE | EVE-OH | | |
| Example 3 | 42.7 | 54.3 | / | 2.5 |  | 0.57 | 174 | 8-10% |
| Example 4 | 43.3 | 53.8 | / | 2.2 |  | 0.65 | 175 | 8-10% |
| Example 5 | 41.2 | 55.3 | / | 2.83 |  | 0.65 | 171 | 10-13% |
| Example 6 | 42.0 | 54.7 | / | / | 2.7 | 0.63 | 173 | 8-10% |
| Example 7 | 42.3 | 55.1 | / | / | 1.97 | 0.59 | 173 | 8-10% |
| Comp. Ex. 1 | 45.2 | 55.4 | / | / | 2.1 | / | 177 | 4-5% |

Examples 8-22

Cross-Linking Reaction and Adhesion Test of Vinyl Fluoride-Based Copolymers

Resin solutions are prepared by dissolving the vinyl fluoride-based copolymers synthesized in Examples 1-7 at 50 to 70° C. in N-methyl-2-pyrrolidone. Titanium acetylacetonate (TYZOR® AA 75, made by DuPont Co.) is selected as a cross-linking agent. This cross-linking agent is dissolved in N-methyl-2-pyrrolidone to provide a 10% solution.

The above solution of the cross-linking agent, titanium acetylacetonate, is added to the resin solution in amounts of 1%, 3% and 5% (% is by weight relative to the vinyl fluoride-based copolymer resin), and mixed uniformly.

The mixed solution of this resin and the cross-linking agent is put into an aluminum cup (No. 107, made by AS ONE Corp.) and subjected to drying and cross-linking at 150° C. for 2 hours in a vacuum dryer (LCV-232, made by TABAI ESPEC Corp.) After cooling to room temperature, adhesiveness of the resulting resin film to the aluminum substrate is evaluated by visual observation. The results are shown in Table 4.

TABLE 4

|  | Vinyl Fluoride Copolymer Resin | Amount of Cross-linking Agent used (C.A./Resin wt %) | Adhesion Evaluation Test |
|---|---|---|---|
| Example 8 | Derived from Ex. 1 | 1 | Fair |
| Example 9 | Derived from Ex. 2 | 1 | Fair |
| Example 10 | Derived from Ex. 3 | 1 | Fair |
| Example 11 | Derived from Ex. 4 | 1 | Fair |
| Example 12 | Derived from Ex. 5 | 1 | Fair |
| Example 13 | Derived from Ex. 1 | 3 | Good |
| Example 14 | Derived from Ex. 2 | 3 | Good |
| Example 15 | Derived from Ex. 3 | 3 | Good |
| Example 16 | Derived from Ex. 4 | 3 | Good |
| Example 17 | Derived from Ex. 5 | 3 | Good |
| Example 18 | Derived from Ex. 1 | 5 | Good |
| Example 19 | Derived from Ex. 2 | 5 | Good |
| Example 20 | Derived from Ex. 3 | 5 | Good |
| Example 21 | Derived from Ex. 4 | 5 | Good |
| Example 22 | Derived from Ex. 5 | 5 | Good |

C.A.: Cross-linking Agent
Fair: Partly separated.
Good: No separation.

When this example is performed without any adding any crosslinking agents, the resulting films peel off completely from the aluminum substrates. On the other hand, the resulting films of Examples 13-16 which employ crosslinking agents show excellent adhesiveness to the aluminum substrates. In addition, the resulting films of Examples 8-12 with partial crosslinking reactions show fair adhesiveness.

Examples 23-25

Tensile Properties Test of Vinyl Fluoride-Based Copolymers

Examples 23-25 illustrate tensile strengths and elongations at break measured by TENSILON of VF copolymer films prepared in Examples 12, 17 and 22. The results are shown in Table 5.

TABLE 5

|  | Width Mm | C.S. Area $mm^2$ | Maximum Stress MPa | Stress at Upper Yield Point MPa | Elong. at Break % GL | Elastic Modulus MPa | Proof Strength (1)MPa |
|---|---|---|---|---|---|---|---|
| Ex. 23 | 4.95 | 0.35 | 31.856 | 20.54 | 379.5 | 645.71 | 12.468 |
| Ex. 24 | 4.95 | 0.30 | 29.032 | 22.869 | 299.18 | 743.53 | 13.826 |
| Ex. 25 | 4.95 | 0.30 | 31.256 | 21.913 | 328.45 | 709.64 | 15.53 |

C.S. Area: Cross-sectional Area; Elong.: Elongation

As shown in Table 5, it is found that the cross-linked resins of the invention have good mechanical properties such as high maximum stress and elongation at break values.

Examples 26-28

Aqueous Dispersions of Cross-Linkable Vinyl Fluoride-Based Copolymers and their Crosslinking Reactions Using the same or similar conditions as in Examples 1-7, several aqueous dispersions of crosslinkable vinyl fluoride-based copolymers having the polymer compositions shown in Table 6 are prepared and examined. The aqueous dispersions and the cross-linking agents (melamine resin, Cymel 350, CYTEC INDUSTRIES INC.) are mixed uniformly. The mixtures are put into aluminum cups (No. 107, made by AS ONE Corp.) and subjected to drying and cross-linking at 190° C. for 5 hours in a vacuum dryer. After cooling to room temperature, the resulting coatings are evaluated by visual observation. The results are shown in Table 6.

TABLE 6

|  | Composition of Polymer (mole %) | | | | Amount of Cross-linking Agent used (C.A./ Resin wt %) | Thermo-stability |
| --- | --- | --- | --- | --- | --- | --- |
|  | TFE | VF | PEVE | PSEPVE | | |
| Ex. 26 | 34.7 | 64.1 | 1.0 | 0.1 | 10 | Good |
| Ex. 27 | 32.7 | 66.7 | 0.6 | 0.1 | 10 | Good |
| Ex. 28 | 51.0 | 45.0 | 2.3 | 2.0 | 10 | Good |

C.A.: Cross-linking Agent. (melamine resin, Cymel 350, CYTEC INDUSTRIES INC.)
Good: No separation and no carbonization.

What is claimed is:

1. A vinyl fluoride copolymer comprising:
about 40 to about 69.9 mole % of repeat units derived from vinyl fluoride; and
about 30.1 to about 60 mole % of repeat units derived from monomer consisting of (a) and (b) below, with the proviso that about 0.1 mole % to 50 mole % of repeat units in said copolymer are derived from monomer selected from (b):
(a) tetrafluoroethylene; and
(b) fluorinated vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide, wherein the functional group of said fluorinated vinyl monomer provides a crosslinkable reaction site wherein at least about 30 mole % units of said vinyl fluoride copolymer are derived from tetrafluoroethylene.

2. The vinyl fluoride copolymer of claim 1 further comprising about 0.1 to about 10 mole % of repeat units derived from monomer (c) selected from the group consisting of fluorinated vinyl ethers, fluorinated alkyl (meth)acrylates, perfluoroolefins having 3-10 carbon atoms, perfluoro $C_1$-$C_8$ alkyl ethylenes, fluorinated dioxoles, and mixtures thereof.

3. The vinyl fluoride copolymer of claim 1 wherein monomer (b) is fluorinated vinyl ether monomer containing said at least one functional group.

4. An aqueous liquid dispersion comprising said vinyl fluoride copolymer of claim 1 dispersed in an aqueous medium.

5. A shaped article formed from said aqueous liquid dispersion of claim 4.

6. The shaped article of claim 5 in the form of a film.

7. An organic liquid dispersion or solution comprising said vinyl fluoride copolymer of claim 1 dispersed or dissolved in an organic liquid medium.

8. A shaped article formed from said organic liquid solution or dispersion of claim 7.

9. The shaped article of claim 8 in the form of a film.

10. A coating composition comprising the crosslinkable polymeric composition of claim 1 and a liquid medium.

11. A shaped article formed from said coating composition of claim 10.

12. The shaped article of claim 11 in the form of a film.

13. A shaped article formed by molding said vinyl fluoride copolymer of claim 1.

14. A crosslinkable polymeric composition comprising:
said vinyl fluoride copolymer of claim 6; and
at least one crosslinking agent selected from the group consisting of alcohols, phenols, thiols, peroxides, amines, azo compounds, carboxylic acids, carboxylic esters, acid anhydrides, sulfonic acids, sulfonic esters, phosphoric acids, phosphoric esters, boric acids, boric esters, epoxies, isocyanates, thiocyanates, nitriles, melamines, aldehydes, sulfide compounds, silane compounds, metal oxides, halogen compounds and organic metal compounds.

15. A crosslinked polymer formed by crosslinking the composition of claim 14.

16. A crosslinkable polymeric composition comprising said vinyl fluoride copolymer of claim 1 having units derived from at least two monomers selected from (b) which provide functional groups which are capable of cross-linking with each other.

17. A crosslinked polymer formed by self-crosslinking said vinyl fluoride copolymer of claim 16.

18. A fluoropolymer blend comprising:
a vinyl fluoride copolymer comprising:
about 40 to about 90 mole % of repeat units derived from vinyl fluoride; and
about 10 to about 60 mole % of repeat units derived from monomer selected from the group consisting of (a) and (b) below, with the proviso that about 0.1 mole % to 50 mole % of repeat units in said copolymer are derived from monomer selected from (b):
(a) monomer selected from the group consisting of tetrafluoroethylene, trifluoroethylene, chlorotrifluoroethylene and mixtures thereof; and
(b) fluorinated vinyl monomer containing at least one functional group selected from the group consisting of hydroxyls, thiols, carbonyls, carboxylic acids, carboxylic esters, acid anhydrides, sulfonyls, sulfonic acids, sulfonic esters, phosphoric acids, phosphoric esters, boric acids, boric esters, epoxies, isocyanates, thiocyanates, amines, amides, nitriles and halogen selected from bromide and iodide, wherein the functional group of said fluorinated vinyl monomer provides a crosslinkable reaction site; and at least one fluoropolymer different from said vinyl fluoride copolymer.

19. The vinyl fluoride copolymer of claim 18 wherein monomer (b) is fluorinated vinyl ether monomer containing said at least one functional group.

* * * * *

UNITED STATES PATENT AND TRADEMARK OFFICE
CERTIFICATE OF CORRECTION

PATENT NO. : 7,842,765 B2
APPLICATION NO. : 11/962134
DATED : November 30, 2010
INVENTOR(S) : Ronald Earl Uschold, Jian Wang and Masahiro Yamamoto Page 1 of 1

It is certified that error appears in the above-identified patent and that said Letters Patent is hereby corrected as shown below:

Title Page
Related U.S. Application Data
"(62) Division of application No. 60/876,442, filed on Dec. 21, 2006." should read:
--(62) Provisional application No. 60/876,442, filed on Dec. 21, 2006.--

Column 11, lines 34 through 36:
"reaction site wherein at least about 30 mole % units of
said vinyl fluoride copolymer are derived from tetrafluoroethylene."
should read:

--reaction site
wherein at least about 30 mole % units of said vinyl fluoride
copolymer are derived from tetrafluoroethylene.--

Signed and Sealed this
Nineteenth Day of April, 2011

David J. Kappos
*Director of the United States Patent and Trademark Office*